(12) United States Patent
Zhao (10) Patent No.: US 7,566,357 B2
(45) Date of Patent: *Jul. 28, 2009

(54) METHOD OF PRODUCING FINE-PARTICLE COPPER POWDERS

(75) Inventor: Gang Zhao, Sumter, SC (US)

(73) Assignee: Phibro Wood, LLC, Ridge Field, NJ (US)

( * ) Notice: Subject to any disclaimer, the term of this patent is extended or adjusted under 35 U.S.C. 154(b) by 130 days.

This patent is subject to a terminal disclaimer.

(21) Appl. No.: 11/717,699

(22) Filed: Mar. 14, 2007

(65) Prior Publication Data

US 2007/0213228 A1    Sep. 13, 2007

(51) Int. Cl.
*B22F 9/20* (2006.01)
(52) U.S. Cl. .......................................... 75/351; 75/373
(58) Field of Classification Search ........................ None
See application file for complete search history.

(56) References Cited

U.S. PATENT DOCUMENTS

| | | | |
|---|---|---|---|
| 4,735,676 A | 4/1988 | Iwasa | |
| 4,997,674 A | 3/1991 | Parr et al. | |
| 5,011,546 A | 4/1991 | Frazier et al. | |
| 5,492,681 A | 2/1996 | Pasek et al. | |
| 6,095,532 A | 8/2000 | Martin | |
| 6,391,087 B1 * | 5/2002 | Hayashi et al. | 75/373 |
| 6,432,320 B1 | 8/2002 | Bonsignore et al. | |
| 6,646,147 B2 | 11/2003 | Richardson et al. | |
| 6,875,252 B2 | 4/2005 | Sano et al. | |
| 6,905,531 B2 | 6/2005 | Richardson et al. | |
| 2001/0002558 A1 | 6/2001 | Sano et al. | |
| 2004/0200318 A1 | 10/2004 | Kim et al. | |
| 2004/0221685 A1 | 11/2004 | Jeong et al. | |
| 2006/0042416 A1 | 3/2006 | Yoon et al. | |
| 2006/0236813 A1 | 10/2006 | Zhao et al. | |

FOREIGN PATENT DOCUMENTS

| | | | |
|---|---|---|---|
| JP | 02/294415 A | * | 12/1990 |
| RU | 2111835 | | 5/1998 |
| RU | 2111835 C1 | * | 5/1998 |
| SU | 1082567 | | 3/1984 |

OTHER PUBLICATIONS

Preparation of Very Finely Divided Copper By The Thermal Decomposition Of Copper Formate Monoethanolamine Complexes, Kimchenko, Y.I., et al, Poroshkovaya Metallurgiya, No. 5(245), pp. 14-19 (May 1983).

Preparation of Nickel Powders in Nonaqueous Media, Macek, J. and Dejen, A., FIZIKA: A:4 (1995) 2, p. 309-314 (English).

* cited by examiner

*Primary Examiner*—George Wyszomierski
(74) *Attorney, Agent, or Firm*—Hayden Stone PLLC; Christopher G. Hayden (57) ABSTRACT

Methods for producing finely divided copper or copper alloy powders are described, from compositions containing metal ions and an alkanolamine, preferably monoethanolamine, wherein the alkanolamine acts as a primary reducing agent. In preferred embodiments the methods for producing micron and submicron copper powder utilize precursor compositions containing copper ions in the form of submicron particles of copper carbonate, copper hydroxide, copper oxides, or any combination thereof, and utilize monoethanolamine (or optionally but less preferably hydrazine), and preferably additionally containing caustic and a reducing sugar.

18 Claims, 4 Drawing Sheets

METHOD OF PRODUCING FINE-PARTICLE COPPER POWDERS

RELATED APPLICATIONS

This application claims priority to U.S. Provisional Application No. 60/672,979 filed on Apr. 20, 2005, and to Ser. No. 11/342,605 filed on Jan. 31, 2006, the disclosures of which is incorporated herein for all purposes.

FIELD OF THE INVENTION

The present invention is directed to a method of synthesizing copper metal powders by wet milling a copper salt to a desired particle size; converting the milled copper salt to cuprous oxide, cupric oxide, or mixture thereof; and then further converting the copper oxide particles to copper powder with a reducing agent at elevated temperature and in a preferred embodiment in the presence of a caustic, a reducing sugar, and a reducing agent which can be in alternative inventions either monoethanolamine or hydrazine, and preferably in the absence of ammonia and low molecular weight reducing organic acids such as formate. The process may advantageously be done as a batch, for example by admixing copper sulfate particles, a reducing sugar, caustic, and between 1.5 and 2 grams of monoethanolamine into a reactor and maintaining the temperature above about 100° C., for example between 103° C. and 110° C.

BACKGROUND OF THE INVENTION

There are a variety of uses for fine copper (Cu) powder, for example in Plasma Display Panels, Field Emission Displays, automobile lights and the like. For example, Cu powder is formulated into an electrically conductive metal paste material, which may be conductive on compression or alternatively on sintering, where said paste is employed in multilayer passive devices, for example, a multilayer ceramic chip capacitor. Generally, micron-sized particles are useful for conductive pastes, such as described for example in U.S. Pat. No. 4,735,676, U.S. Pat. No. 4,997,674, and U.S. Pat. No. 5,011,546. The current generation of multilayer integrated circuit devices preferably utilize sub-micron copper powder, e.g., with a particle size ranging from 0.8 microns to about 0.1 microns, for example to produce the conductive material for inner electrodes on integrated circuits.

Many different methods have been proposed in the synthesis of a copper powder used in the conductive paste as described above, but they can generally be classified as either a gas phase method and a liquid phase method. Conventional methods for manufacturing metal powders have various problems such as a low yield due to wide particle size distribution, large particle size, low sphericity, and difficulty in controlling a degree of oxidation.

The gas phase method, also known as the gas atomization method, involves forcing high-pressure inert gas and molten copper through a nozzle with sufficient velocity to "atomize" the liquid metal, which on cooling yields a metal powder. Although this method is suitable for mass production, it is difficult to manufacture a nano-scaled powder (e.g., particles with a diameter equal to or less than 0.15 microns) with a commercially acceptable yield by this method. To obtain commercially acceptable product, oversized particles must be separated from the particles having a diameter in the preferred range. Such processes are difficult because powders are often irregularly shaped and separation is therefore difficult.

There is also a gas phase thermal decomposition method, where a copper-containing salt that has a weak binding force between metal and anion is thermally decomposed using a gas reducing agent and milled to obtain a metal powder. This method provides a fine metal powder. However, the metal powder may be burned during a heat treatment the burned powder is required to be milled and classified. Therefore, this method has a lower yield than a liquid phase reduction method.

In a gas phase evaporation method, an evaporation material is evaporated by heating in an inert gas or an active gas such as $CH_4$ and $NH_4$, and the evaporated gas is reduced with hydrogen and condensed to obtain a fine metal powder. This method is useful in preparing a metal powder having its particle size of 5 nm to several microns. However, productivity is very low and thus the metal powder is very expensive.

A liquid phase reduction method is a well-known chemical method for manufacturing a metal powder. This liquid phase reduction method can more easily control the shape of the powder. Typically, a metal powder is prepared by a procedure comprising 1) forming a soluble first intermediate, 2) producing an insoluble intermediate product, and 3) adding a reducing agent. A conventional liquid phase reduction method for preparing a copper powder first has copper oxide (copper hydroxide which is then dehydrated to form CuO) precipitated by adding sodium hydroxide (NaOH) to an aqueous copper sulfate solution, and the slurry is then filtered to separate particles from liquid. In a second step, a stable $Cu_2O$ solution is obtained by reacting the CuO with glucose or other monosaccharide having 6 carbons and an aldehyde group. When the color of the resulting solution changes to a dark red due to the production of $Cu_2O$, glycine and arabic gum are added to control the size and surface shape of the final copper powder. Then, a reducing agent, typically formalin or hydrazine, is added to reduce $Cu_2O$ to obtain a copper powder. The particle size of the copper powder varies depending on the conditions existing when each of the many reagents and additives are added, and thus it is difficult to control the particle size.

U.S. Pat. No. 6,875,252 teaches a method of producing a copper powder that the application states has an average particle diameter in the range of from not less than 0.1 micron to less than 1.5 microns, "preferably" between 0.3 to 1.2 microns. The examples, however, showed the minimum size obtained was in fact 0.8 microns using the process described in the patent, and 0.6 using prior art processes. The copper powder is produced by wet reduction of cuprous oxide into metallic copper powder in the presence of ammonia or an ammonium salt. The size of the copper powder is related to the size of the copper hydroxide formed in the first step and also to the size of the copper(I) oxide formed in the secondary reduction. In particular, an aqueous solution of a copper salt and an alkali are reacted to precipitate copper(II) hydroxide. A first reduction step is then conducted in the suspension to reduce the copper(II) hydroxide obtained to cuprous oxide. This first reduction step is performed by adding glucose (a reducing agent) to the obtained copper(II) hydroxide suspension in order to reduce the copper(II) hydroxide to cuprous oxide in the ordinary manner. This first reduction step is preferably carried out under an inert gas atmosphere and increasing temperature (50-90° C.). By blowing an oxygen-containing gas into the suspension of cuprous oxide produced by the primary reduction, the particle diameter increases but the particle size distribution width is narrowed. Then, a second-reduction step is conducted in the suspension to reduce the cuprous oxide obtained to metallic copper, wherein the second reduction step is started by adding about 0.01-0.1 moles ammonia per mole of copper and 1.1 times the chemical equivalent of hydrous hydrazine required for reducing the cuprous oxide to metallic copper. High density smooth surfaced metallic particles produced from this process enable the electrodes to form into solid sintered bodies with few pores by sintering at a low temperature.

U.S. Pat. No. 6,673,134 teaches a method of producing a flaky copper powder having an average major axis diameter of 4 to 10 microns and a flakiness of 2 to 20, where said flaky powder is produced by introducing a copper slurry having fine granular copper particles having an average particle size of 3 to 5 microns dispersed in water into a bead mill containing zirconia beads having a diameter of 0.3 to 1.0 mm and milling, thereby flattening said copper powder. This patent describes the known art, stating "wet synthesis provides copper powder having an average particle size regulated between about 0.2 to 4.mu·m with a narrow particle size distribution but involves high cost and has an economical problem." The patent teaches that after milling "the pulverized copper powder is classified by a classifier (and) the desired fine copper powder is discharged and collected by a cyclone or a bug filter (while) coarse copper powder is fed back to the milling chamber and pulverized again." Such a process does not provide the desired narrow particle size nor the usually desired solid (not flaky) particles.

U.S. published Application 20040221685 (now abandoned) describes a method for manufacturing a copper powder by a wet reduction process, comprising adding appropriate amounts of sodium hydroxide and hydrazine to an aqueous copper chloride solution to finally obtain a copper powder having a particle size of 0.1 microns. A first method for manufacturing the copper powder includes the steps of: (1) adding sodium hydroxide to an aqueous copper chloride solution to give an aqueous solution containing copper oxide and copper hydroxide; and (2) reducing the copper oxide and the copper hydroxide to copper powder by adding hydrazine to the aqueous solution, wherein the composition is kept within a temperature of 40° C. to 80° C. In an alternative method, in an intermediate step, a stable $Cu_2O$ solution is obtained by reacting the obtained CuO with an aldohexose (a monosaccharide having 6 carbons and an aldehyde group) such as glucose. An amino acid, e.g., glycine, and arabic gum are added to the $Cu_2O$ solution to control the size and surface shape of the final copper powder. This patent also describes forming a complex of hydrazine (an amine) and soluble copper salts, and then precipitating copper powder by admixing therein an alkali.

U.S. Pat. No. 5,094,686 teaches a method of producing a powder which comprises thermally decomposing anhydrous copper formate in a solid phase in a non-oxidizing atmosphere at a temperature in the range of from 150° to 300° C., thereby yielding a copper fine powder having a primary particle diameter of from 0.2 to 1 microns, a specific surface area of from 5 to 0.5 $m^2/g$ and small agglomerating properties.

Preparation of Very Finely Divided Copper by the Thermal Decomposition of Copper Formate Monoethanolamine Complexes, Kimchenko, Y. I., et al, Poroshkovaya Metallurgiya, No. 5(245), pg. 14-19 (May 1983) describes and compares the processes of forming copper powder by the thermal decomposition of copper formate versus the thermal decomposition of a copper-monoethanolamine formate complex. Monoethanolamine (MEA) is a known alternative to ammonia to form aqueous soluble complexes of copper. To get high concentrations of the dissolved complex in the solution, there should be a supply of anions to form a stable copper-MEA-anion complex, and commercially the anion is carbonate, chloride, nitrate, borate, citrate, sulfate, acetate, or the like. Low molecular weight organic acids such as formic acid and oxalic acid are a known reducing agent. In this work, the composition did not comprise much water, as copper formate dihydrate was dissolved in straight MEA to form the starting mixture. Formation of metallic copper by thermal decomposition of copper formate dihydrate (or alternatively from copper oxalate) is known. When decomposing copper formate, there are two isotherms shown in a differential thermal analysis. The first, hitting a maximum at about 380° K (107° C.) corresponds to the dehydration of the dihydrates, while the second, hitting a maximum at about 453° K (180° C.) corresponds to the decomposition of formate and the formation of metallic copper. When a copper-monoethanolamine-formate solution is used, the differential thermal analysis shows five endotherm effects. The first isotherm at 384° K (111° C.) relates to dehydration, the second isotherm at 405° K (132° C.) relates to detachment and removal of 1 mole of MEA, and the third isotherm at 419° K (146° C.) relates to decomposition of the complex and the formation of metallic copper (formed at temperatures as low as 139° C.). The remaining isotherms relate to boiling off/condensing the remaining organics. While this method is useful, the use of copper formate as a precursor is expensive. Further, the paper noted the resultant copper powder had, as a result of uncompensated surface forces, crystal lattices in a state of dis-equilibrium, having macro- and micro-stresses therein.

There is a need for cost-effective method of preparing stable copper powder that does not require one or more low molecular weight organic acids, e.g., formate ions and/or oxalate ions, or expensive and unstable reducing agents such as hydrazine, for each copper ion.

SUMMARY OF THE INVENTION

Described herein are novel methods of preparing micron to submicron particles of copper metal, called collectively copper powder. Copper powders of various particle sizes are used in variety of products, and there is considerable pressure to reduce the cost of making the powder. There is a high need for copper powders having a very narrow particle size distribution, and a further premium for copper powders having narrow particle size distributions (mass of total particles versus particle size) centered between 0.04 microns and 0.2 microns, preferably powders having an average particle size of between 0.04 and 0.07 microns, between 0.07 and 0.095 microns, between 0.1 and 0.15 microns, and between 0.15 and 0.2 microns. By narrow particle size distribution we mean that 90% by weight, preferably 94% by weight, of the copper powder particles in a representative sample have an effective diameter within 30%, preferably within 20%, of the average diameter.

Copper powders are formed by admixing a slurry of micron to submicron particles of copper oxide, preferably cuprous oxide, with a reducing agent. The reducing agent can be monoethanolamine and/or hydrazine, but monoethanolamine provides considerable cost benefits. Further refinement of the copper particle size, particle size distribution, and particle morphology is obtained by wet milling the copper oxide particles prior to conversion thereof into copper powder. However, we have found that the minimum particle size of the ultimate copper metal powder product is limited by particle growth/agglomeration which occurs during the final reduction steps which convert cuprous oxide to copper powder.

Cuprous oxide can be prepared by methods known in the art, for example by reacting copper sulfate and caustic solutions, and then converting the copper hydroxide slurry to cuprous oxide by the addition of glucose. Advantageously this is done under a reducing atmosphere or an inert atmosphere. In a preferred embodiment of the current invention, a cuprous oxide slurry is added into a reactor containing a hot (>100° C.) monoethanolamine solution, and the monoethanolamine will act as the reducing agent to provide a copper powder in within 30 minutes after addition. In previous work, we had added the monoethanolamine in an amount equal to at least 3, more typically at least 3.5, moles monoethanolamine per mole of copper (which is about the same as grams of monoethanolamine per gram of copper). We have previously noted that simple conversion with monoethanolamine required high temperatures and about a 30 minute reaction time, and regardless of the starting copper oxide particle size (the average diameter is that where half the weight of the particles has a diameter greater than the average, and half the weight of the of the particles has a diameter less than the average), it was difficult to obtain copper powder having a size less than 0.15 microns. Particles were apparently dissolving and re-precipitating resulting in overall increases in the average particle diameter.

We have surprisingly found, however, that if the cuprous oxide particles having an average diameter of for example between 0.05 and 0.4 microns are reacted in the presence of a reducing sugar such as glucose and a small amount of caustic, then only about 1.5 to 2, for example 1.6 to 2 or 1.7 to 1.8, more typically only 1.75, grams of monoethanolamine are required to completely reduce one gram of copper. The reaction between copper oxide and monoethanolamine, where monoethanolamine is the reducing agent (that is, low molecular weight reducing acids, hydrazine, and the like are not present, and also where sugar and caustic are not present), requires a temperature of greater that 120° C. to achieve a commercially useful reaction rate. Additionally, the reaction can take 20 to 30 minutes to reach completion. In the presence of 1.75 grams of monoethanolamine per gram of copper, a reducing sugar such as glucose, and a small amount of caustic, however, the reduction reaction of submicron cuprous oxide takes place quickly, in for example 10 minutes, at a temperature of only 101° C. to 106° C. As a result, particle growth during the conversion of copper oxide to copper metal is greatly reduced, and copper powder having an average particle size of 0.12 microns have been obtained.

The prior art has suggesting adding dispersant to the slurry. This is not particularly beneficial, as this material seemed to increase particle growth during the reduction reactions.

We have also found that it is beneficial to use copper salts other than copper sulfate as a starting material to form the cuprous oxide, to avoid the multiple washings needed to remove traces of sulfate. A preferred starting material is basic copper carbonate, which if present as large particles can be quickly wet-milled using sub-millimeter zircon-based milling media to a resultant average particle size of less than 0.2 microns. A small amount of sodium hydroxide and glucose added to a slurry of sub-micron particles of basic copper carbonate will convert the basic copper carbonate to cuprous oxide, and there will be no sulfate or other residual salts left on the cuprous oxide.

Alternatively, the starting material can be a slurry of wet-milled sub-micron copper hydroxide (12.9% Cu, 0.11 microns). A small amount of sodium hydroxide and glucose added to a slurry of sub-micron particles of copper hydroxide will convert the copper hydroxide to cuprous oxide, and there will be no sulfate or other residual salts left on the cuprous oxide.

As mentioned above, we have found that adding a small amount of caustic to a slurry prior to initiating the reducing reactions is beneficial if a small average particle size is desired. The amount of caustic added is small—enough to obtain a pH between 10 and 12, preferably between 10.5 and 11.5, for example about 11.

After adding caustic, cuprous oxide can be converted to copper powder by simple addition of hydrazine. This reaction takes place at low temperatures, and the reaction is fairly fast (30 minutes to an hour) even at low temperatures. Even so, the particle size distribution of the resulting product is bimodal, suggesting particle growth by agglomeration during the reduction of the cuprous oxide to copper metal. Advantageously, if the initial cuprous oxide slurry is sub-0.15 micron, and if the reaction is done quickly at for example a temperature of 55° C. and 80° C., for example from 60° C. and 70° C., then the resulting powder can also be sub-0.15 micron powder.

Large micron-sized copper powders can also be formed. A solution of boiling copper sulfate can be treated by slow addition of a solution containing glucose, caustic, and about 1.75 grams monoethanolamine per gram of dissolved copper, followed by high temperature digestion for an extended period of time, will form a copper powder having a particle size of 3 microns.

BRIEF DESCRIPTION OF THE DRAWINGS

The accompanying figures are included to provide further graphical depictions of the data and photographs of particles.

DESCRIPTION OF THE SELECTED EMBODIMENTS

One embodiment of the invention generally includes methods for producing finely divided copper from compositions containing copper ions (in solution or in a salt or oxide form) and an alkanolamine, preferably monoethanolamine, and optionally water, salts, and/or inorganic bases, by thermal decomposition where the alkanolamine acts as a primary reducing agent. The invention in one embodiment includes a process of reducing ethanolamine-complexed copper ions in a precursor composition to copper metal. The invention more particularly relates to compositions and methods for producing micron and submicron copper metal powder from compositions comprising or consisting essentially of copper ions, inorganic anions, inorganic bases, monoethanolamine, and optionally water.

In one aspect, the invention provides for a process for producing micron-sized to sub-micron-sized copper powder comprising the steps of: providing a precursor composition comprising a solution of more than 5% copper ions and more than 20% monoethanolamine, by weight, with the proviso that there is less than 0.8 moles of a low molecular weight organic acid per mole of copper ions; and heating the precursor composition to a temperature wherein the copper ions are converted to copper powder, said powder having greater than 90% by weight copper and having a mean diameter of between about 0.02 microns and about 5 microns. The invention may include several embodiments. The reduction is performed at a temperature between 90° C. and 150° C., preferably between 130° C. and 155° C. Preferably, the composition comprises less than 0.4 moles of the low molecular weight organic acid per mole of copper ions. The composition may further comprise less than 0.4 moles total of the low molecular weight organic acid and of hydrazine per mole of copper ions. Preferably, there is less than 0.4 moles hydrazine is present per mole of copper ions in the precursor composition. Preferably, the precursor composition comprises less than 0.1 moles of a low molecular weight organic acid per mole of copper ions. Most preferred, the composition is substantially free of the low molecular weight organic acid and/or of hydrazine. The reduction may be performed wherein at least a portion of the copper ions in the precursor composition are in the form of particles of copper salts, copper hydroxides, copper oxides, or mixtures or combinations thereof. The reduction is performed having a mole ratio of monoethanolamine to copper ions of at least 1.5:1. The reduction is performed wherein at least one mole of monoethanolamine is consumed per mole of copper powder formed. The resulting copper powder has a mean diameter of between about 0.2 microns and about 1.3 microns. Advantageously and preferably, the precursor composition comprises more than 12% copper, more than 25% monoethanolamine, and more than 0.2% of a counterion, wherein less than one half the equivalents of the counterion are low molecular weight organic acids.

In another aspect, the invention provides for a process for producing micron-sized to sub-micron-sized copper powder comprising the steps of: providing a precursor composition comprising copper ions and monoethanolamine, with the proviso that the mole ratio of ethanolamine to copper ions is at least 1 and there is less than 0.4 moles total of a low molecular weight organic acid and hydrazine per mole of copper ions; and heating the precursor composition to a temperature wherein the copper ions are converted to copper powder, said powder having greater than 90% by weight copper and having a mean diameter of between about 0.02 microns and about 5 microns. This aspect of the invention may include several embodiments. The reduction is performed where no common reducing agents are added to the precursor composition. The precursor composition comprises less than 0.1 moles of a low molecular weight organic acid per mole of dissolved copper ions. Preferably, the precursor composition is substantially free of the low molecular weight organic acid. The reduction is performed at a temperature between 90° C. and 150° C., preferably between 130° C. and 155° C. The reduction is performed where at least one mole of monoethanolamine is consumed by the reduction process per mole of copper powder formed.

In a third aspect, the invention provides for a process for producing micron-sized to sub-micron-sized copper powder comprising the steps of: providing a precursor composition consisting essentially of copper ions, monoethanolamine, an inorganic counterion, optionally water, and optionally an reducing sugar, wherein the mole ratio of monoethanolamine to copper ions is at least 1:1; and heating the precursor composition to a temperature wherein copper ions are converted to copper powder, said powder having greater than 90% by weight copper and having a mean diameter of between about 0.02 microns and about 5 microns. This aspect of the invention may include several embodiments. The reduction is performed where no common reducing agents are added to the precursor composition. Preferably the reduction is performed where the precursor composition comprises less than 0.1 moles of low molecular weight organic acid per mole of copper ions. Preferably, the reduction is performed where the precursor composition is substantially free of low molecular weight organic acid. The reduction is performed at a temperature between 90° C. and 150° C., preferably between 130° C. and 155° C. The reduction is performed wherein at least one mole of monoethanolamine is consumed by the reduction process per mole of copper powder formed. The reduction is performed where the mole ratio of monoethanolamine to copper ions is at least 1.5:1.

The invention includes a method of manufacturing fine particle copper powders by 1) providing the precursor composition comprising copper ions, finely divided copper salts, finely divided cuprous oxide particles, or any combination thereof, and an alkanolamine, preferably an ethanolamine, more preferably monoethanolamine, and 2) reducing the copper ions through thermal decomposition of the precursor composition. Advantageously the composition comprises a reducing sugar, and an amount of caustic sufficient to maintain a pH between 10 and 12, preferably between 10.5 and 11.5. Advantageously and preferably the reduction is performed in the absence of other reducing agents, e.g., formates, oxalates, hydrazine, and the like. Advantageously and preferably the reduction of copper ions that are complexed or contained as a solid in the precursor composition results in the production of fine, micron-sized to sub-micron-sized particles of copper metal.

Initial experiments were conducted on an aqueous copper MEA carbonate composition, and the process involved heating the composition to temperatures between about 70° C. which were slowly ramped up to a maximum of about 140° C. to 150° C. This process yielded uniform copper powders of primary particle size between 1-2 microns. In an aqueous copper MEA carbonate composition, water is a carrier, copper is the complexed metal, MEA are the complexing ligands, and carbonate is the counterion.

The invention also include a process of forming copper alloy particles. The precursor solution or slurry need only contain other alloy-able metal ions, which can be reduced under conditions where the copper is reduced. If the precursor solution is a slurry of a copper salt, a copper hydroxide, or a copper oxide, then advantageously the non-copper metal which forms the alloy should be dispersed in the solid phase. Generally, any non-copper metals present should be limited to a few weight percent or less, based on the total weight of the alloy powder product. Advantageously and preferably the reduction of copper ions, and non-copper metals such as nickel ions, optionally tin ions, optionally zinc ions, or any combinations thereof is performed in the absence of other reducing agents, e.g., formates, oxalates, hydrazine, and the like. Ethanolamine, preferably monoethanolamine, provides the principal reducing agent. In some embodiments glucose or the like can be added to a composition comprising copper (II) ions, as this is a cost-effective method of producing copper(I) ions. In some embodiments caustic is added to the composition to aid the reduction reaction, minimize particle growth during the reduction reaction, or both. In such embodiments, an alkanolamine, preferably monoethanolamine, provides the principal reducing agent for reducing copper(I) ions to copper metal.

If the reduction process of the current invention is not taken to completion, particles comprising or consisting essentially of copper(I) oxide, or a mixture of copper(I) oxide and copper metal, can be obtained.

As used herein, unless specified, all percents are percent by weight.

In one embodiment, where the precursor composition comprises an aqueous solution of complexed copper(II) ions, the precursor composition comprises at least 8% copper, preferably at least 10% copper, and more preferably at least 12% copper. The precursor composition advantageously comprises at least 3 moles, preferably between about 3.5 and about 4 moles, of monoethanolamine per mole of copper(II) ions to be complexed. If the precursor composition comprises copper(I) ions, then the composition advantageously additionally comprises at least 1.5 moles, preferably between about 1.75 and about 2 moles, of monoethanolamine per mole of copper(I) ions to be complexed. Excess monoethanolamine has no negative effects, other than the process eventually requires energy to remove the excess monoethanolamine from the reaction mixture, for example by distillation. Nickel can partially or completely replace copper in this embodiment, where nickel replaces copper on a mole for mole basis. In another embodiment, up to about one half, but preferably less than one quarter, and more preferably less than one sixth, the moles of copper ions can be replaced with other metals, for example nickel, zinc, tin, and the like. Such mixtures may be useful in formulating alloy powders having a melting temperature below that of copper, for example.

In some embodiments where all the metal ions, for example copper ions, are complexed and in solution in the precursor composition, there is between 2.5 and 4 moles of ethanolamine, preferably monoethanolamine, per mole of metal ions (e.g., copper) to be reduced to metal powder. In an alternate embodiment, the invention also encompasses embodiments wherein up to one half, but preferably one third or less, of the moles of monoethanolamine in a precursor composition are replaced by other alkanolamines capable of complexing copper ions in an aqueous composition, e.g., diethanolamine, triethanolamine, and/or isopropanolamine. In some embodiments a precursor composition comprising triethanolamine and/or diethanolamine, in combination with MEA, is preferred. Under some conditions we believe their higher—OH to formula ratio is advantageous for the copper reduction. In other embodiments, the composition is substantially free, e.g., has less than 2%, of these other alkanolamines, and monoethanolamine is the primary reducing agent.

Advantageously there is at least 1 mole, preferably at least 1.5 moles of alkanolamine, preferably ethanolamine, more preferably monoethanolamine, per mole of metal ions to be reduced to metal powder. Advantageously, for metal ions such as copper(I) ions with a charge of positive one, it is advantageous to have at least 1 mole, preferably at least 1.5 moles of ethanolamine, preferably monoethanolamine, per mole of metal ions. Advantageously, for metal ions such as copper(II) ions with a charge of positive two, it is advantageous to have at least 1.5 moles, preferably 2 moles, of ethanolamine, preferably monoethanolamine, per mole of metal ions. Inclusion of a reducing sugar or other non-alkanolamine agent useful for reducing copper(II) ions to copper(I) ions will reduce the amount of alkanolamine needed for full conversion of metal ions to metal powder.

Preferably, the composition is substantially free, e.g., has less than 1%, and more preferably less than 0.1% or 0%, of ammonia. Alternately, the reaction mixture comprises between 0.001 moles and 0.1 moles of ammonia per mole of metal ions to be reduced, e.g., copper.

It is known that copper can be dissolved directly into ethanolamine. This can be very economical, as described for example in U.S. Pat. Nos. 6,905,531 and 6,905,532, the disclosures of which are incorporated herein by reference. Compositions made by such methods as are described in those patents comprise significant amounts of water. Generally, water is not preferred in precursor compositions where the copper is in a soluble, complexed form. It is believed that most water is distilled from the precursor composition before the temperature necessary for the reduction of copper or nickel ions by monoethanolamine can proceed at a useful rate. For this reason, advantageously the composition comprises less than 50% water, preferably less than 35% water, more preferably less than 20% water. Addition of caustic and reducing salts may also alleviate the problem to some degree, as less temperature is needed to obtain a commercially acceptable copper ion reduction reaction rate.

The presence of reducing organic acids such as formic acid are not preferred. The formic acid in monoethanolamine will reduce copper ions to copper metal, but careful analysis of the temperature plateaus during such reactions indicate the monoethanolamine does not participate in the reduction process, at least until the formic acid is exhausted. Therefore, most if not all of the monoethanolamine in the precursor composition is not utilized in the reduction of copper ions, and the cost of the process is increased by the inclusion of expensive yet non-operative ingredients.

It is possible to have solid copper salts and/or copper oxides contracting the alkanolamine in the precursor composition. Then, the particle size of the precursor salts is believed to have a strong influence on the degree of conversion of copper ions to copper metal, and also on the particle size of the resultant copper salts. However, if an average particle size below 0.2 microns is desired, for example a copper powder having an average particle size between about 0.04 and 0.07 microns (as shown in one example infra), or between 0.07 and 0.095 microns, or between 0.1 and 0.19 microns, particle growth during the reduction reactions by either agglomeration or by a dissolution/reprecipitation process, or by both, has a strong effect on the ultimate particle size.

As used herein, particle diameters may be expressed as "dxx" where the "xx" is the weight percent (or alternately the volume percent) of that component having a diameter equal to or less than the dxx. The d50 is the diameter where 50% by weight of the component is in particles having diameters equal to or lower than the d50, while just under 50% of the weight of the component is present in particles having a diameter greater than the d50. Particle diameter greater than 0.2 microns is preferably determined by Stokes Law settling velocities of particles in a fluid, for example with a Model LA 700 or a CAPA™ 700 sold by Horiba and Co. Ltd., or a Sedigraph™ 5100T manufactured by Micromeritics, Inc., which uses x-ray detection and bases calculations of size on Stoke's Law, to a size down to about 0.15 microns. Smaller sizes may be determined by a dynamic light scattering method, preferably with a laser-scattering device, or may be measured by direct measurements of diameters of a representative number of particles in SEM photographs. For particles between about 0.01 microns and about 0.15 microns, the particle size can be determined by taking SEMs of representative particles within the size range and measuring the diameter in two directions (and using the arithmetic average thereof) for a representative sample of particles, for example between 100 particles to about 400 particles, where the relative weight of the particles within this fraction are assumed to be that weight of a spherical particle having a diameter equal to the arithmetic average of the two measured diameters.

Wet ball milling (or an equivalent milling process) of copper salts and/or oxides can readily remove by attrition particles having a size over 1 micron. The size distribution of the particles advantageously has the vast majority of particles, for example at least about 95% by weight, preferably at least about 99% by weight, more preferably at least about 99.5% by weight, be of an average diameter less than about 1 micron, and advantageously the particles are not rod-shaped with a single long dimension. The solid precursor metal salts or oxides after the milling procedure should have: a d99 of less than 2 microns, preferably less than 1.4 microns, more preferably less than 1 microns; a d98 of less than 2 microns, preferably less than 1 micron, more preferably less than 0.8 microns; a d50 of less than 0.9 microns, preferably less than 0.7 microns, more preferably less than 0.5 microns, for example between about 0.06 to 0.17 microns or between 0.1 and 0.3 microns.

There are a wide variety of milling methods. The preferred is by wet milling in a sand grinder or wet-ball mill charged with, for example, zirconium silicate and/or zirconia beads with diameter about 0.2 mm to about 0.9 mm, typically about 0.5 mm; 3) alternately wet milling in a rotary sand grinder with or example, zirconium silicate and/or zirconia beads with diameter about 0.2 mm to about 0.9 mm, typically about 0.5 mm and with stirring at for example about 1000 rpm. In preferred embodiments of this invention, metal salt and/or oxide particulates are advantageously wet milled in a ball mill having milling media (beads) which preferably comprise a zirconium compound such as zirconium silicate or more preferably zirconium oxide. The size of the milling material is believed to be important, even critical, to obtaining a commercially acceptable product (milled in a commercially acceptable time, such as less than 30 minutes) if particles are present in the precursor composition.

The milling media need not be of one composition or size. Further, not all the milling material need be the preferred material, i.e., having a preferred diameter between 0.1 mm and 0.8 mm, preferably between 0.2 mm and 0.7 mm, more preferably between 0.3 mm and 0.6 mm, and having a preferred density equal to or greater than 3.8 grams/cm·sup·3, preferably greater than or equal to 5.5 grams/cm·sup·3, more preferably greater than or equal to 6 grams/cm·sup·3. In fact, as little as 10% of this media will provide the effective grinding. The amount of the preferred milling media, based on the total weight of media in the mill, can be between 5% and 100%, is advantageously between 10% and 100%, and is preferably between 25% and 90%, for example between about 40% and 80%. Media not within the preferred category can be somewhat larger, say 1 mm to 4 mm in diameter, preferably from 1 mm to 2 mm in diameter, and advantageously also has a density equal to or greater than 3.8 grams/cm·sup·3. Preferably at least about 10%, preferably about 25%, alternately at least about 30%, for example between about 50% and about 99%, of the media has a mean diameter of between about 0.1 mm to about 0.8 mm, preferably between about 0.3 mm and about 0.6 mm, or alternatively between about 0.3 mm and about 0.5 mm. The preferred milling procedure includes wet milling, which is typically done at mill setting between about 600 rpm and about 4000 rpm, for example between about 1000 rpm and about 2500 rpm. Faster revolutions provide shorter processing times to reach the minimum product particle size. Generally, the selection of the milling speed, including the speed in a scaled up commercial milling machine, can be readily determined by one of ordinary skill in the art without undue experimentation, given the benefit of this disclosure.

A copper(II) precursor composition (such as a slurry of copper hydroxide) may comprise at least 0.5 moles hydroxide ion, preferably between about 0.75 to 2.5 moles hydroxide ion, per mole of copper (II) ions. Advantageously, however, even cuprous oxide slurry precursor compositions comprise a base (a hydroxide source). For example, hydroxide source such as sodium hydroxide, ammonium hydroxide, and potassium hydroxide, and the like, or any mixtures thereof, or combinations thereof. The hydroxide source may be added to the solution as an aqueous solution or as a solid then dissolved in water. If the copper powder will be used for microelectronics, ammonium hydroxide or potassium hydroxide are preferred.

Advantageously the reaction composition is substantially free of common reducing agents, e.g., hydrazine. By substantially free of common reducing agents we mean less than about 0.1 moles, preferably less than 0.05 moles, more preferably less than 0.01 moles or no moles of common reducing agent per mole of copper ions in the precursor composition.

In other embodiments, reducing salts and hydrazine are used as the primary reducing agent.

In some embodiments the reaction composition is substantially free of weak primary reducing agents, e.g., an aldohexose such as glucose. By substantially free of common reducing agents we mean less than about 0.02 moles, more preferably less than 0.01 moles or no moles of weak primary reducing agent per mole of copper ions in the precursor composition. The preferred methodology, however, has a reducing sugar present. Prior to or during the dissolution, a weak primary reducing agent optionally can be added in an amount and at conditions known in the art to convert copper(II) ions to copper(I) ions, e.g., one part of an aldohexose such as glucose to 1 part copper in a slurry having 3-4 parts water at a temperature of greater than about 50° C. will generally suffice.

The preferred methodology, however, has a reducing sugar present. In other embodiments the reaction composition comprises weak primary reducing agents, e.g., an aldohexose such as glucose. Generally having between about 0.03 and about 0.4 moles, typically between 0.04 moles and 0.1 moles of weak primary reducing agent per mole of copper ions in the precursor composition is sufficient to convert a substantial portion of copper(II) ions to copper(I) ions prior to the reduction by the thermal decomposition of the alkanolamine.

Without being bound to the theory, we believe the monoethanolamine is primarily responsible for the reduction of copper ions to copper metal. The MEA is operative to reduce either or both of copper(I) and/or copper(II) ions to copper metal powder.

Copper oxide (CuO, $Cu_2O$, or both) is reduced in a monoethanolamine composition, for example in an aqueous monoethanolamine composition.

It may well be that copper salts, hydroxide, or oxides is dissolved (at least partially) in the monoethanolamine composition, for example in an aqueous monoethanolamine composition, during the reduction reaction.

In yet another alternate embodiment, one or more copper salts such as soluble salts such as copper sulfate, copper chloride, and the like; one or more sparingly soluble copper salts such as copper carbonate, basic copper carbonate, basic copper sulfate (including particularly tribasic copper sulfate), basic copper nitrate, copper oxychloride, copper borate; basic copper borate, or any mixtures thereof, are dissolved or partially dissolved in a monoethanolamine composition, for example in an aqueous monoethanolamine composition, to form the precursor composition. Alternatively, these salts can be dissolved and then be precipitated as a hydroxide by addition of caustic, and the reaction composition can be a slurry of copper hydroxide.

Most precursor compositions that are solutions comprise water and excess alkanolamine. It is rare that the precursor composition is saturated with copper, and generally, copper salts and/or copper oxide may be at least partially soluble in the precursor composition.

The process involves heating this precursor composition to form a reaction composition. Typically the excess water and by-products of the reaction, are allowed to vaporize. Generally, exposure to air is not desired, though the process can go forward even with air exposure provided the exposure to oxygen is minimized. See, for example, U.S. Pat. No. 5,492,681, particles of copper oxide can be formed if aqueous copper ammonia composition is placed in a vessel with excess ammonium salt and with oxygen, and then the mixture is stirred and heated to a temperature of between approximately 70° and 130° C. The instant process may be conducted at atmosphere pressure, under vacuum, or at an increased pressure, e.g., between about 1 and about 6 bars absolute pressure. In some embodiments the thermal decomposition process can take place in an inert environment or in a low-oxygen environment, for example in a atmosphere comprising one or more of an inert gas such as helium or nitrogen, water vapor, or organics including monoethanolamine and/or organic reaction by-products. The boiling point of MEA at one atmosphere is about 170° C. The flash point of MEA, open cup, is only about 93.degree. C. Therefore, in the absence of an oxidizing environment such as in air, the thermal decomposition will provide vaporous byproducts that can be flammable or explosive. Eliminating oxygen eliminates the flammability/explosive mixture concern, and will also help prevent or delay the formation of copper oxide on the surface of newly formed copper powder.

We believe the reduction reaction takes place at a temperature of between about 95° to about 150° C., more likely at a temperature between about 100° to about 140° C. If a reducing sugar and/or caustic are present, commercially acceptable rates may be obtained at temperatures between 100° and 110° C. If these extra components are not present, commercially acceptable rates may be obtained at temperatures between 130° and 140° C.

It may be advantageous to perform the thermal decomposition at increased pressure or at reduced pressure. If run at reduced pressure, then the removal of volatiles can take place at reduced temperature. On the other hand, if run at increased pressure, then much of the energy used to vaporize water and ethanolamine will be saved, as these components may remain in fluid form and not vaporize. For example, the thermal decomposition can be performed in an inert atmosphere comprising one or more of water vapor, MEA vapor, helium, or nitrogen, at an absolute pressure of about 5 bars, and very little of the water will be evaporated, thereby providing a huge energy saving when compared to the energy requirements of distilling the water from the reaction mixture before reaching the reaction temperature.

Generally, we believe water is not necessary for the reduction reaction to proceed. Removing water by distillation involves a high energy cost. It may be advantageous to remove some water from the precursor composition by for example exerting pressure on the composition while the composition is in contact with a membrane that is more soluble to water than to ethanol (reverse osmosis), by contacting the precursor composition with a dehydrating agent such as anhydrous calcium sulfate and/or copper sulfate (absorption), or by en electrodialysis pretreatment wherein a voltage is imposed across an ion exchange membrane in contact with the precursor composition under conditions which will concentrate the precursor composition in active ingredients, in particular copper ions and MEA. Of course, the other option is to use an MEA source that has little or no water.

Generally, the process involves heating the precursor composition to a temperature between about 70° C. and about 170° C., for example between about 90° C. and about 155° C. We believe the reaction occurs when the temperature is between about 95° C. and 150° C., more likely starting to form visually apparent copper powder when the temperature exceeds about 110° C. Advantageously water and reaction byproducts are removed from the reaction composition by vaporization. Reusable material such as water/monoethanolamine vapor can be condensed and re-used.

It is important to note that the reduction of copper ions by monoethanolamine is believed to alter the structure of the monoethanolamine, (probably consuming at least one mole monoethanolamine per mole of copper reduced) so that this portion of the monoethanolamine can not be reused. There may be monoethanolamine that is not involved in a reduction reaction, and this MEA can be reclaimed and reused. In contrast, when formate or other reducing agent is used, we believe most or all the MEA can be recovered and reused, as the MEA will not change its structure.

The process is advantageously carried out in a fluid composition. In one embodiment, the fluid is converted into an aerosol, and the thermal conversion occurs in an oven. The particle size of the resulting copper can be influenced by the particle size of the individual droplets of the precursor composition introduced to the oven. The oven can be maintained at one temperature, or the oven can have different temperatures are different locations to maximize the reaction rate while preventing such fast vaporization of volatiles that droplets are broken apart.

Generally, the process produces high purity copper metal particles with a particle size that is variable (depending on process conditions), but which can not readily be made smaller than about 0.1 microns and can not readily be made larger than about 10 microns. Typical process conditions and adjuvants can provide spherical or round particles having a size that is between about 0.2 microns and about 1.5 microns. That is not to say that a large particle size distribution is made. It appears that at least 80% of the total weight of particles produced has a particle diameter within about 50% of the mean weight particle diameter.

Described herein is a novel method of synthesizing copper metal powders by milling a copper salt to a desired particle size; converting the milled copper salt to a cuprous (or cupric) oxide; and then further converting the cuprous oxide particles to copper powders with a reducing agent. Various embodiments include one or more of:

1) Adding reducing sugars;
2) Adding a surface active agent such as glycine, arabic gum, xanthan gum, and the like, preferably before the copper powder is formed;
3) Adding a surface active agent such as an azole, preferably after the copper powder is formed; and
4) Adding copper to the copper-MEA precursor composition to dissolve additional copper, either before or concurrent with converting a portion of the complexed copper(I) ions to copper(I) ions.

In one embodiment of the invention, copper(II) ions can be reduced to copper(I) ions by exposure to a weak reducing agent, e.g., by exposure of the material to a reducing sugar such as glucose. At such time, either the precursor composition can be contacted with additional copper metal, copper oxides, and/or copper salts (as the conversion of copper(II) ions to copper(I) ions results in excess MEA compared to the amount of MEA needed to solubilize the copper). Alternately, the thermal decomposition can proceed directly from the point where reducing sugar is added to the reaction composition.

In one embodiment, one or more surface-active agents can be added to the reaction mixture to stabilize the copper powder and to retard surface oxidation. Copper powder is often used for forming electrical connections, and a layer of copper oxide on a particle surface can increase chances of failure in the resultant product. Exemplary surface-active agents include azoles and their substituted derivatives, particularly aromatic azoles (including diazoles, triazoles, and tetrazoles), such as benzotriazole, tolyltriazole, 2,5-(aminopentyl)benzimidazole, alkoxybenzotriazole; imidazoles, such as oleyl imidazoline; thiazoles, such as mercaptobenzothiazole, 1-phenyl-5-mercaptotetrazole; thiodiazoles, halogen-resistant azoles, and combinations thereof. Thiodiazoles substituted on the ring by a mercapto group and/or an amino group and triazoles substituted by a mercapto group and/or an amino group are effective. Examples of halogen-resistant azoles include 5,6-dimethyl-benzotriazole; 5,6-diphenylbenzotriazole; 5-benzoyl-benzotriazole; 5-benzyl-benzotriazole and 5-phenyl-benzotriazole. Alkyl-substituted aromatic trazoles, such as tolyltriazole are particularly preferred. Azoles are particularly useful with copper-containing powders, such as pure copper or copper alloys, e.g. copper-zinc. These compounds form a film on the particles, and are advantageously solubilized in a solvent and contacted with the copper particles.

The particle size of copper powder can be reduced by milling after forming the copper powder. U.S. Pat. No. 6,432,320 describes a process of manufacturing a 0.05 micron powder for refrigerants by ball milling commercially available spherical 1-5 microns particle size copper particles.

In one important embodiment, the invention includes a process for producing micron-sized to sub-micron-sized copper powder comprising the steps of: 1) providing a precursor composition comprising, or consisting essentially of, a solution of more than 5% copper and more than 20% monoethanolamine, by weight; and 2) heating the precursor composition to a temperature wherein copper monoethanolamine complex is converted to copper powder. Alternate embodiments comprise 1) providing a precursor composition comprising, or consisting essentially of, a solution of more than 5% copper, more than 20% monoethanolamine, and more than 0.2% carbonate as weight % carbon dioxide; and 2) heating the precursor composition to a temperature wherein copper monoethanolamine complex is converted to copper powder. A third important embodiment comprises 1) providing a precursor composition comprising, or consisting essentially of, a solution of more than 12% copper, more than 25% monoethanolamine, and more than 0.2% of a counterion, wherein less than one half the equivalents of the counterion are low molecular weight organic acids; and 2) heating the precursor composition to a temperature wherein copper monoethanolamine complex is converted to copper powder. In each of the above embodiments, advantageously no common reducing agents are present in or added to the precursor composition; the precursor composition comprises less than 0.1 moles of a low molecular weight organic acid per mole of dissolved copper; the precursor composition is substantially free of low molecular weight organic acid (i.e., less than 0.1 moles low molecular weight organic acid per mole of copper); the precursor composition comprises at least 0.5 mole of hydroxide ion per mole of copper ion; and advantageously the heating is to a temperature between about 95.degree. and about 150.degree. C., more beneficially between about 105.degree. C. and 140.degree. C. In each of the above embodiments, advantageously at least one mole of monoethanolamine is consumed by the reduction process per mole of copper powder formed.

EXAMPLES

Certain embodiments of this invention, as well as certain advantages of this invention, are illustrated by the preceding non-limiting examples. Although only a limited number of examples are disclosed herein, in the interests of brevity and clarity, it will be apparent to those skilled in the art that many modifications, both to materials and methods, may be practiced without departing from the purpose and interest of this invention.

Example 1

Cuprous oxide was prepared by reacting copper sulfate and caustic solutions, and then converting the copper hydroxide slurry to cuprous oxide by the addition of glucose under an inert atmosphere. The resulting cuprous oxide slurry was added into a reactor containing hot monoethanolamine solution. Cuprous oxide was converted to copper powder in within 30 minutes after addition. The copper powder was recovered and determined to have an average particle size of 0.126 microns. However, the particle size distribution was bimodal, wherein a small fraction of the particles had a particle size distribution centered at several times the median particle size of the slurry.

Example 2

Copper powder was made following the same procedure as in Example 1, except a small amount of dispersant (Ultrazine NA) was added to the cuprous oxide before converting it to copper powders. The resulting copper powder had an average particle size of 0.158 microns.

Example 3

A copper carbonate slurry was wet-milled using sub-millimeter zircon-based milling media to a resultant average particle size of 0.15 micron. A small amount of sodium hydroxide was added to the slurry, and the slurry was converted to cuprous oxide by addition of glucose. The cuprous oxide thus obtained had a particle size of about 0.10 micron. On converting the cuprous oxide to copper with MEA we obtained copper powder having an average particle size of 0.147 microns.

Example 4

Figure 1:
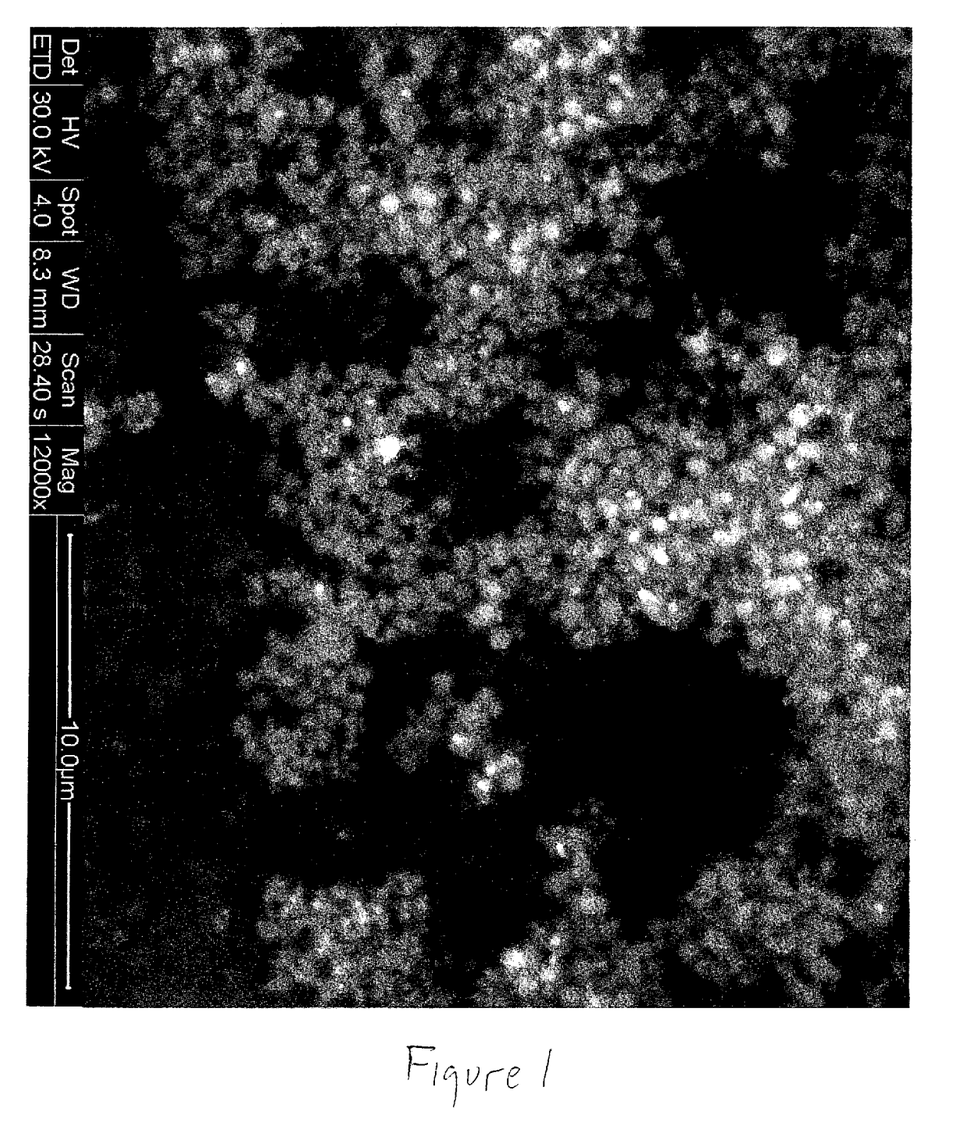
FIG. 1 is a scanning electron micrograph of copper powder produced by a method of the invention described in Example 4. Sharp definition was not obtained as the machine appeared to be out of focus.
Figure 2:
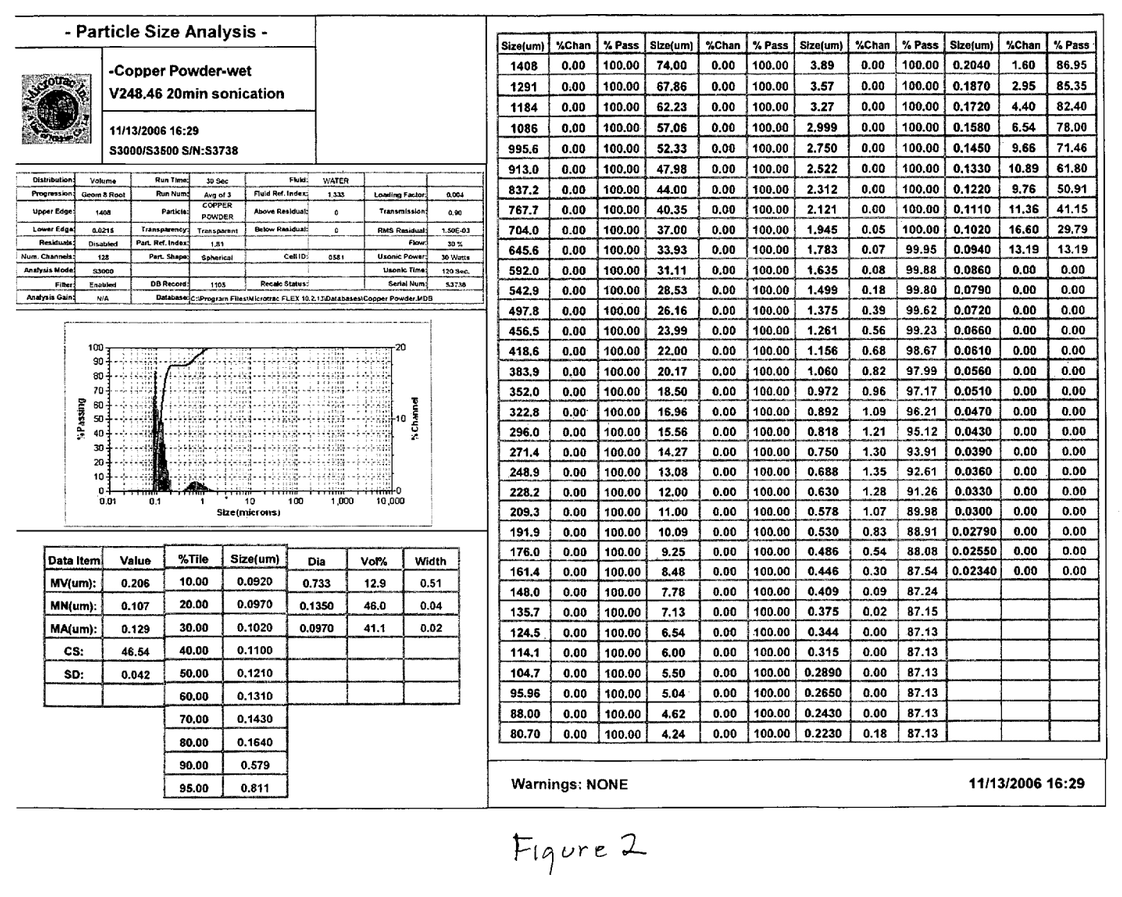
FIG. 2 shows details of a particle size analysis of copper powder produced by a method of the invention described in Example 4.
Figure 3:
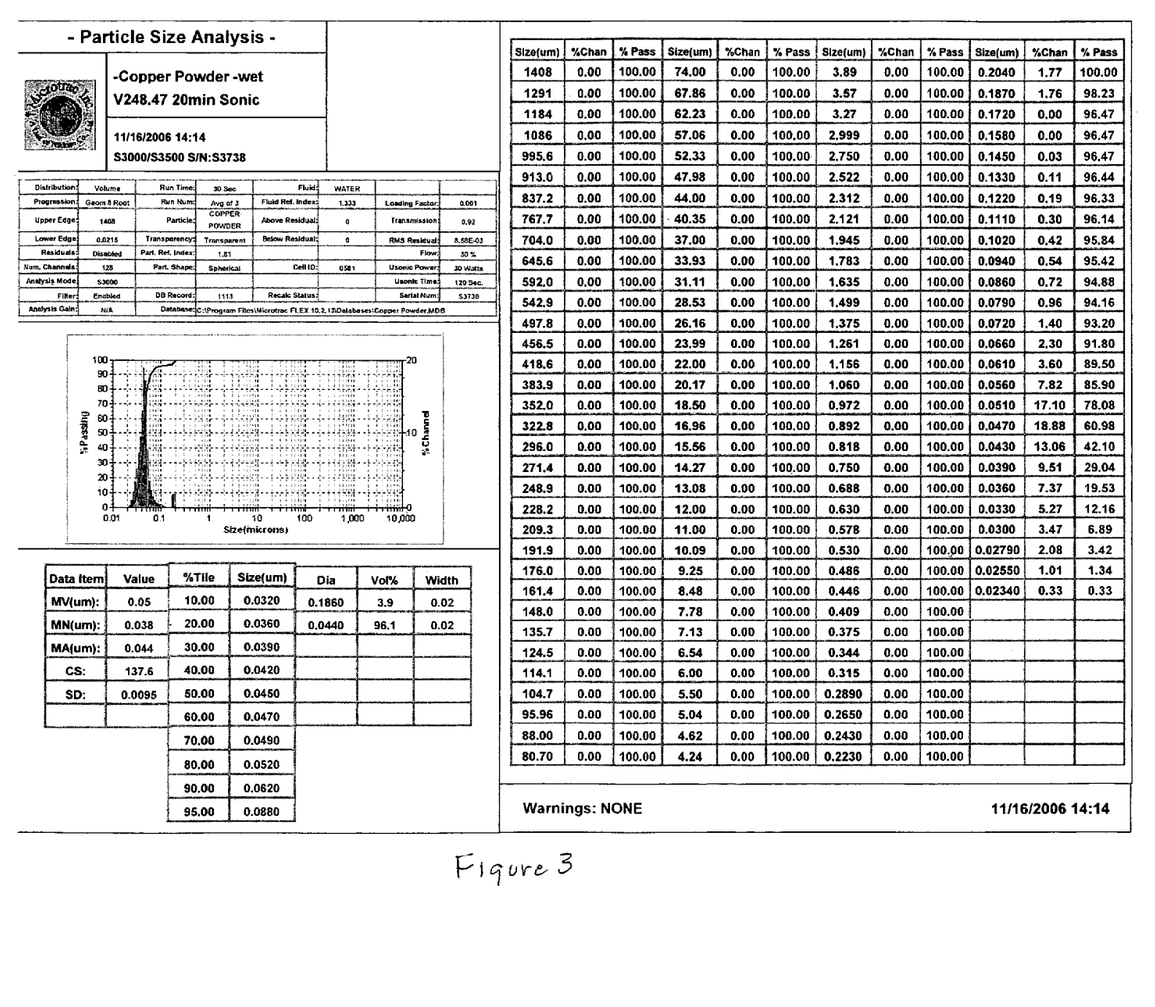
FIG. 3 shows details of a particle size analysis of copper powder produced by a method of the invention described in Example 5.
Figure 4:
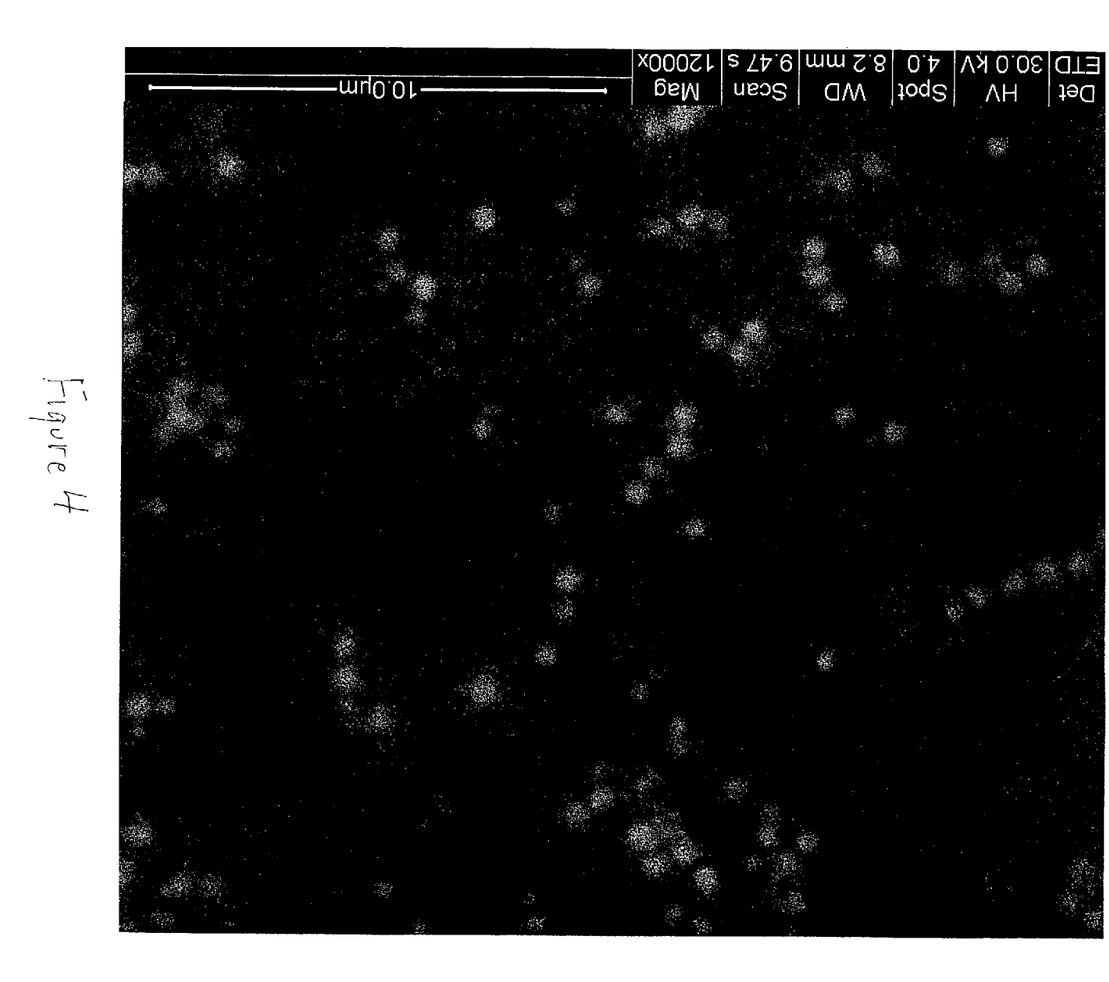
FIG. 4 is a scanning electron micrograph of copper powder produced by a method of the invention described in Example 5. Sharp definition was not obtained as the machine appeared to be out of focus.

A slurry was prepared containing 38.6 grams of wet-milled copper hydroxide (12.9% Cu, 0.11 microns) and 100 g of deionized water in a 500-ml (beaker) reactor. A reducing solution was prepared by dissolving 22 g of D-glucose into 50 ml of deionized water. After pouring this glucose solution into the agitated copper carbonate slurry (under a nitrogen atmosphere) and maintaining a reaction temperature of 60° C. to 70° C. for one hour, a cuprous oxide slurry was obtained. The pH of the slurry was 8.2 at the end of the reaction. The pH of the cuprous oxide slurry was adjusted to 11 by adding 2.4 g of 50% caustic solution before proceeding to convert the cuprous oxide to copper powder. The conversion of cuprous oxide to copper was achieved by adding 2.8 grams of hydrazine (80% active) all at once at the beginning of the reaction, and conducting the second reduction in the same reactor at between 65° C. and 80° C. for one hour under nitrogen. The resulting copper powder particle size was determined by Microtrac to have an average particle size of 0.11. However, the particle size distribution is clearly bimodal with about 10% by weight of the particles having a diameter of about between about 0.4 and 1 microns, centered about 0.6 microns, and about 87% by weight of the particles having a diameter of about between about 0.2 and 0.09 microns. An SEM of the copper particles is provided in FIG. 1.

Example 5

The reactor was charged with 25-g of wet-milled basic copper carbonate (20% Cu, 0.10 micron particle size) and 100-g DI-water. The slurry was agitated under a nitrogen blanket, and was heated to 65° C. before adding 22 g glucose in 50 ml of deionized water. The reaction was maintained between 60° C. and 75° C. for six hours until the slurry turned into yellowish color indicative of sub-micron cuprous oxide. Conversion of the cuprous oxide to copper was conducted in the same reactor by adding 2,8-g hydrazine (80% active). The converting reaction took about 50 minutes. Microtrac reported an average particle size of 0.045 micron. However, the particle size distribution is bimodal with about 3.5% by weight of the particles having a diameter of about between about 0.2 microns and about 90% of the particles having a diameter of about between about 0.3 and 0.12 microns Example 6

The reactor was charged with a solution of copper sulfate which was heated to boiling temperature of about 103° C. to 106° C. To this boiling solution was added a solution containing glucose, caustic, and about 1.75 grams monoethanolamine per gram of dissolved copper. The temperature was maintained at between 103° C. to 106° C., and copper powder formed having a particle size of 3 microns.

Examples 7 to 16

Table 1 below summarizes important information for a number of examples. The monoethanolamine:copper ion mole ratio varied from about 1.5 to about 3.5 for these examples. The glucose:copper mole ratio varied from about 0 to about 0.35. Copper recovery is typically greater than 98%.

Example 7

About 25 g of an aqueous copper monoethanolamine carbonate ("CMC") solution (d=1.25 g/cc, 9.6% Copper & 32.5% MEA) was agitated and heated in a beaker at a boiling temperature. After bulk of the solution was evaporated, the decomposition of CMC started spontaneously and produced a brown-colored slurry. Brown-colored powers were separated from slurry through filtration. The powders were washed with DI water and a final wash of acetone (it will be referred as standard method later). After drying in 50° C. oven, the power was analyzed for copper by iodometric titration. The copper content was found to be 94%.

The CMC solution contained 32.5% MEA, 9.6% copper, up to about 10% carbon dioxide (as carbonate), and the balance, e.g., about 50% by weight, comprised water. It is believed that most of the water was evaporated from the CMC solution prior to the reaction taking place, by which we infer that the reaction takes place at faster rates at a temperature higher than 100° C.)

Example 8

About 255 grams of the same CMC solution used in experiment #1 was placed into a 500-ml Erlenmeyer filtration flask. The solution was agitated and heated under partial vacuum (using water pump) until the composition started to boiling. After about 100-150 g water was evaporated, the brown-colored particles started to appear in the reaction media. The evaporation and decomposition of the CMC solution was continued for about 10 minutes until the reaction media turned into brown-colored slurry with some white-colored fume visible above the slurry surface. After separation of the copper powders from the slurry, the powder was given the standard wash and dry. There was about 24.5 grams of copper in the CMC precursor composition, and 22.5 grams of dried copper powder was recovered, giving about 92% recovery. The copper content of the powders were found to be about 105% by iodometric titration. Scanning microscopic (SEM)

TABLE 1

| EXAMPLE | MEA/CU MOLE RATIO | CU RECOVERY | GLUCOSE/ CU RATIO | ANIONS | PROCESS | DIAMETER, MICRONS |
| --- | --- | --- | --- | --- | --- | --- |
| 7 | 3.5 | 92% | 0 | $CO_3$ | CMC + ΔH/VAC | 1-2 |
| 8 | 3.5 | 98% | 0 | $CO_3$ | CMC + GUM + ΔH/VAC | ~1 |
| 9 | 3.5 | 98% | 0.04 | $CO_3$ | CMC + GLU + ΔH/VAC | <1 |
| 10 | 3.5 | 98% | 0.07 | $CO_3$ | CMC + GLU + ΔH/VAC | <1 |
| 11 | 2.4 | 97% | 0.05 | $CO_3/OH$ | CMC + $CUCO_3$ + GLU + ΔH/VAC | NM |
| 12 | 2.5 | 98% | 0 | $CO_3/OH$ | CMC + ΔH/VAC + $CUCO_3$/$CU(OH)_2$ + ΔH/VAC | 1.3* |
| 13 | 1.5 | NM | 0 | $SO_4/OH$ | $CUSO_4$ + NAOH + ΔH/VAC | 0.3-0.4 |
| 14 | 7.8 | | 0.35 | $SO_4/OH$ | $CUSO_4$ + NAOH + GLU + ΔH/VAC + MEA + ΔH/VAC | 0.2 (3 AGG) |
| 15 | 1.5 | | 0.34 | $SO_4$ | $CUSO_4$ + NAOH + GLU + MEA + ΔH/VAC | ~0.9 |
| 16 | 3.5 | 99.6% | | $CO_3/OH$ | CMC + ΔH/VAC + NAOH + ΔH/VAC | ~1 (3.6 AGG) |

*Estimated from surface area pictures of the obtained copper powders revealed agglomerates of particles with uniform primary particle sizes between 1-2 microns.

Example 9

This experiment was similar to that in Example 8 but 252 g CMC was mixed with 0.25 g Rodopol 23 (xanthan Gum) prior to beginning the thermal decomposition process. There was about 24.2 grams copper in the CMC precursor composition, and 23.9 g dried copper powder was recovered, giving better than 98% recovery. The particle size of the powders was slightly reduced (to the eye) compared to the particles obtained in Example 2.

Example 10

This experiment was similar to that in Example 8 but 250 g CMC was mixed with 2,5-g glucose to form the precursor composition. About 23.3 g dried copper powder was recovered, giving 97% recovery. The particle size of the powders was significantly reduced (to the eye) comparing to previous batches.

Example 11

This experiment was similar to that in Example 10 but 5-g glucose was used. About 23.8-g dried copper powder was recovered, so the recovery was about 99%. The particle size of the powders was slightly reduced (to the eye) from experiment #4, but was again significantly reduced as compared to those formed in Examples 1 to 3.

Example 12

This experiment was similar to that in Example 11 but 251-g CMC, 5-g glucose and 22-g copper carbonate (56% Cu) were admixed to form a precursor composition. The composition appeared to form a solution. The precursor composition therefore had about 12.3 grams copper from the added copper carbonate and 24.1 grams copper from the CMC solution, for a total of 36.5 grams copper. About 34.5-g dried copper powder was recovered, giving a 94% recovery.

Examples 13

About 10 kg CMC solution (9.5% copper), was weighed and boiled it until about half of the original volume left. About 860 g basic copper carbonate were added to the reactor and continued to boil. The conversion reaction to copper powder was completed when the reaction temperature reached about 150 C. Obtained 1350 g fine powders with a surface area of 0.47 m²/g and a particle size of approximately 1.5 micron.

Example 14

About 340-g MEA were mixed with 230-g DI-water in a beaker and then agitated. About 273-g copper sulfate pentahydrate (CSP) was added and allow to dissolve completely into MEA solution. Then, 477-g caustic solution (18%) was added and the solution in beaker turned into viscous slurry. The slurry was heated and evaporated to a boiling temperature of about 150° C. After maintaining the temperature above 150° C. for a few minutes, the reaction was completed. Copper particles were filtered and washed with DI-water, and then a 15-ml acetone final wash. Some purple-colored (probably due to small particle size rather than surface oxidation) copper powder was obtained. It contained 97.7% copper and had a surface area of 2.11 m2/g and a particle size of less than 0.5 micron.

Example 15

About 20-g CSP was weighed and dissolved it into 60-ml DI-water. About 36-g 18% NaOH solution was added to form copper hydroxide slurry with good agitation. Then 5-g glucose was added to the slurry. The slurry was heated up near boiling temperature. The slurry gradually changed color from blue copper hydroxide into green, then yellow and finally pinkish cuprous oxide. At this point, 39-g MEA (85%) solution was added to the reactor and the slurry was continuously heated and converted. We obtained copper powders with bimodal particle size distribution (0.2 and 3 microns, respectively). That 3 micron particle was actually a cluster of smaller copper particles.

Example 16

About 80-g CSP and 250 ml DI-water were mixed until all CSP crystals dissolved. About 20-g glucose and 100-g MEA were added. The solution was heated to near the boiling temperature. The solution slowly turned into yellow, red and then to purple slurry. Copper powders were obtaining having a 0.76 m2/g in surface area and a particle size less than 1 micron.

Example 17

About 3177-g CMC (9.5% copper) solution was weighed and evaporated until a reddish-color precipitate formed in the solution. Then 515-g (18% NaOH) solution was added to the solution. The reaction of caustic and the concentrated CMC formed viscous green-colored slurry. After continuous evaporation of the slurry, the color of the slurry turned into yellow, then light red, and then dark red when converted to copper particles at the end. 300-g copper powder was collected after washing and drying of the powder. After de-agglomerating the powder through a hammer mill, the particle size was 3.6 microns by Microtrack. Under the microscope, we found that each particle was a cluster of 1 to 3 copper particles sticking together.

Example 18

Nickel sulfate was dissolved into MEA and NaOH solution and then heated to boiling temperature. Metal powder was visually observed on the magnetic stir bar and a metal layer was deposited on the side of the beaker indicating the formation of nickel metal.

The invention claimed is:

1. A method of making finely divided copper or copper alloy powder, said method comprising adding monoethanolamine to a slurry comprising finely divided particles of a solid copper-containing precursor compound selected from the group consisting of a copper salt, copper carbonate, copper hydroxide, cupric oxide, cuprous oxide, or any combination thereof, said monoethanolamine being present in an amount between 1.5 to 2 grams of monoethanolamine per gram of copper, wherein the temperature is between 90° C. and 150° C., for a time sufficient to convert the precursor compound to a copper powder.

2. The method of making finely divided copper or copper alloy powder of claim 1, said slurry additionally comprising caustic and a reducing sugar.

3. The method of making finely divided copper or copper alloy powder of claim 2, said caustic being present in an amount to raise the pH of the slurry to a value between 10.5 and 11.5.

4. The method of making finely divided copper or copper alloy powder of claim 3, wherein said slurry further comprises water.

5. The method of making finely divided copper or copper alloy powder of claim 2, said monoethanolamine being present in an amount between 1.6 to 2 grams of monoethanolamine per gram of copper.

6. The method of making finely divided copper or copper alloy powder of claim 4, wherein said slurry further comprises water.

7. The method of making finely divided copper or copper alloy powder of claim 2, said monoethanolamine being present in an amount between 1.7 to 1.8 grams of monoethanolamine per gram of copper.

8. The method of making finely divided copper or copper alloy powder of claim 2, wherein the copper powder has an average particle size of between 0.04 and 0.07 microns.

9. The method of making finely divided copper or copper alloy powder of claim 2, wherein the copper powder has an average particle size of between 0 0.07 and 0.095 microns.

10. The method of making finely divided copper or copper alloy powder of claim 2, wherein the copper powder has an average particle size of between 0.1 and 0.2 microns.

11. The method of making finely divided copper or copper alloy powder of claim 2, wherein said slurry further comprises water.

12. The method of making finely divided copper or copper alloy powder of claim 1, wherein the solid copper-containing precursor compound is cuprous oxide.

13. The method of making finely divided copper or copper alloy powder of claim 1, additionally comprising adding caustic and a reducing sugar before reacting the copper-containing precursor compound with the monoethanolamine.

14. The method of making finely divided copper or copper alloy powder of claim 1, said slurry additionally comprising caustic and a reducing sugar.

15. The method of making finely divided copper or copper alloy powder of claim 1, wherein said copper-containing precursor compound is cuprous oxide, said method further comprising wet milling the cuprous oxide prior to reacting the cuprous oxide with the monoethanolamine.

16. The method of making finely divided copper or copper alloy powder of claim 1, wherein said copper-containing precursor compound is cuprous oxide having an average particle size between 0.05 and 0.4 microns, said slurry additionally comprising caustic and a reducing sugar.

17. The method of making finely divided copper or copper alloy powder of claim 1, wherein said copper-containing precursor compound is cuprous oxide, and wherein the cuprous oxide is converted to copper powder in 10 minutes or less from the time of adding the monoethanolamine.

18. The method of making finely divided copper or copper alloy powder of claim 1, wherein said slurry further comprises water.

* * * * *